(12) United States Patent
Ahire et al.

(10) Patent No.: US 12,134,166 B1
(45) Date of Patent: Nov. 5, 2024

(54) SYSTEM AND METHOD FOR AUTONOMOUSLY GRINDING A WORKPIECE

(71) Applicant: GrayMatter Robotics Inc., Gardena, CA (US)

(72) Inventors: Avadhoot L. Ahire, Gardena, CA (US); Bharat S. Deshkulkarni, Los Angeles, CA (US); Satyandra K. Gupta, Los Angeles, CA (US); Nathan Ince, Torrance, CA (US); Ariyan M. Kabir, Los Angeles, CA (US); Ashish Kulkarni, Long Beach, CA (US); Sagarkumar J. Panchal, Los Angeles, CA (US); Martin G. Philo, Long Beach, CA (US); Brual C. Shah, San Pedro, CA (US); Jeano J. Vincent, Los Angeles, CA (US)

(73) Assignee: GrayMatter Robotics Inc., Gardena, CA (US)

( * ) Notice: Subject to any disclaimer, the term of this patent is extended or adjusted under 35 U.S.C. 154(b) by 0 days.

(21) Appl. No.: 18/679,276

(22) Filed: May 30, 2024

(51) Int. Cl.
*B24B 51/00* (2006.01)
*B24B 49/04* (2006.01)
*B24B 49/12* (2006.01)
*B24B 49/14* (2006.01)
*B24B 49/16* (2006.01)
(Continued)

(52) U.S. Cl.
CPC ............. *B24B 51/00* (2013.01); *B24B 49/04* (2013.01); *B24B 49/12* (2013.01); *B24B 49/14* (2013.01); *B24B 49/16* (2013.01); *B25J 9/1664* (2013.01); *B25J 11/0065* (2013.01);
(Continued)

(58) Field of Classification Search
CPC ........ B24B 51/00; B24B 49/00; B24B 49/02; B24B 49/04; B24B 49/045; B24B 49/10; B24B 49/12; B24B 49/14; B24B 49/16; B24B 19/14; B25J 9/1653; B25J 9/1664; B25J 9/1679; B25J 9/1697; B25J 11/0065;
(Continued)

(56) References Cited

U.S. PATENT DOCUMENTS

| 2,652,664 | A | * | 9/1953 | Allan | ..................... | B24B 17/04 451/6 |
| 6,599,171 | B2 | * | 7/2003 | Mizuno | ............... | B24B 13/0055 451/6 |

(Continued)

*Primary Examiner* — Eileen P Morgan
(74) *Attorney, Agent, or Firm* — Run8 Patent Group, LLC; Peter Miller; Alexander Rodriguez

(57) ABSTRACT

A method for autonomously grinding a workpiece includes: accessing a virtual model defining a geometry of the workpiece; identifying a grinding region on the workpiece; and projecting a target grinding profile onto the grinding region on the workpiece. The method also includes: based a geometry of the workpiece and the target grinding profile, generating a tool path for removal of material from the grinding region to the target grinding profile; and assigning a target force to the target region. The method also includes, during a processing cycle: accessing a sequence of force values output by a force sensor coupled to a grinding head; navigating the grinding head across the grinding region according to the tool path; and, based on the sequence of force values, deviating the grinding head from the tool path to maintain forces of the grinding head on the grinding region proximal the target force.

19 Claims, 5 Drawing Sheets

(51) Int. Cl.
  *B25J 9/16*     (2006.01)
  *B25J 11/00*    (2006.01)
  *G06T 1/00*     (2006.01)
  *G06T 7/60*     (2017.01)
  *G06T 19/20*    (2011.01)
(52) U.S. Cl.
  CPC .......... *G06T 1/0007* (2013.01); *G06T 1/0014* (2013.01); *G06T 7/60* (2013.01); *G06T 19/20* (2013.01)
(58) Field of Classification Search
  CPC ....... G06T 1/0014; G06T 1/0007; G06T 7/13; G06T 7/60; G06T 19/20
  USPC ...... 451/5, 6, 7, 9, 10, 11, 53, 54, 260, 278, 451/280
  See application file for complete search history.

(56) References Cited

U.S. PATENT DOCUMENTS

| | | | |
|---|---|---|---|
| 11,820,018 B1* | 11/2023 | Ahire | B25J 9/1679 |
| 2006/0196283 A1* | 9/2006 | Yang | G01B 21/08 |
| | | | 451/8 |
| 2020/0171620 A1* | 6/2020 | Aubin | B24B 49/12 |
| 2021/0260720 A1* | 8/2021 | Chankaramangalam | B24B 49/12 |
| 2023/0126085 A1* | 4/2023 | Gong | B25J 9/1653 |
| | | | 700/5 |
| 2023/0278207 A1* | 9/2023 | Ahire | G06T 19/00 |
| | | | 700/245 |
| 2024/0091935 A1* | 3/2024 | Ahire | G06T 1/0014 |
| 2024/0286281 A1* | 8/2024 | Ahire | G06T 7/13 |

* cited by examiner

SYSTEM AND METHOD FOR AUTONOMOUSLY GRINDING A WORKPIECE

CROSS-REFERENCE TO RELATED APPLICATIONS

This Application is related to U.S. Non-Provisional application Ser. No. 17/829,193, filed on 31 May 2022, Ser. No. 18/136,241, filed on 18 Apr. 2023, Ser. No. 18/136,244, filed on 18 Apr. 2023, Ser. No. 18/142,480, filed on 2 May 2023, Ser. No. 18/232,275, filed on 9 Aug. 2023, and Ser. No. 18/389,166, filed on 13 Nov. 2023, each of which is hereby incorporated in its entirety by this reference.

TECHNICAL FIELD

This invention relates generally to the field of grinding and more specifically to a new and useful system and method for autonomously grinding a workpiece in the field of grinding.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
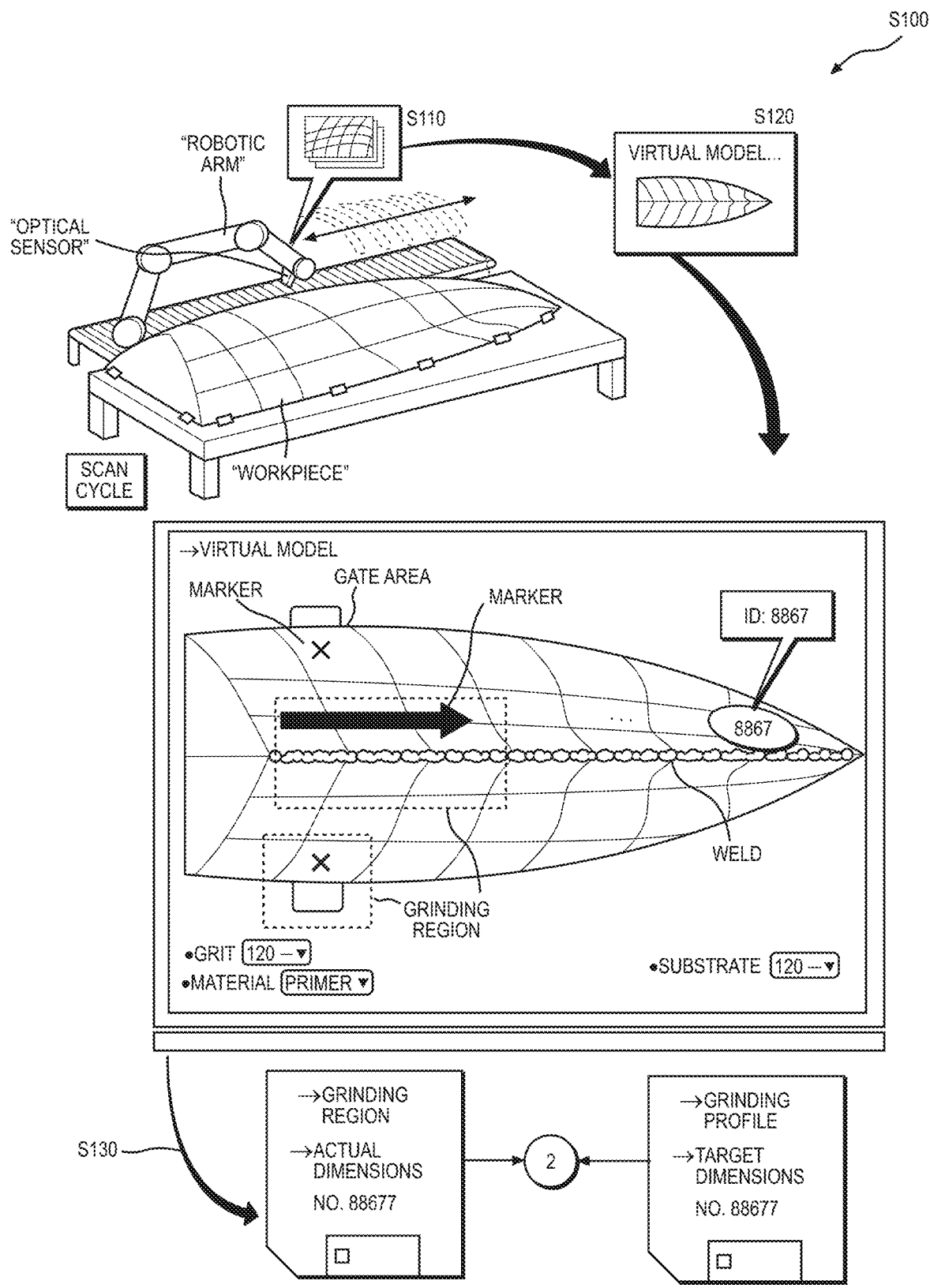
FIG. 1 is a flowchart representation of a method.
Figure 2:
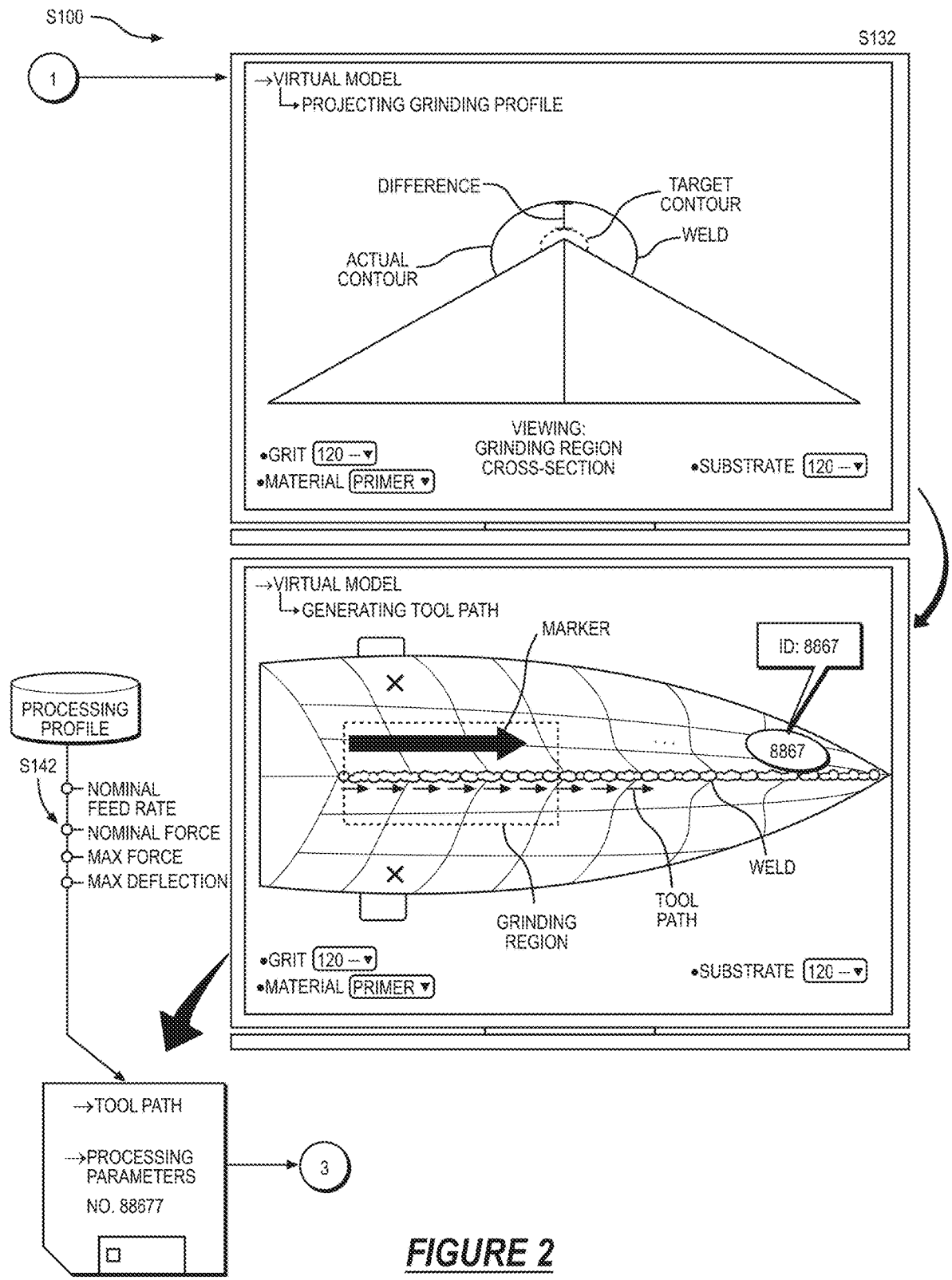
FIG. 2 is a flowchart representation of the method.
Figure 3:
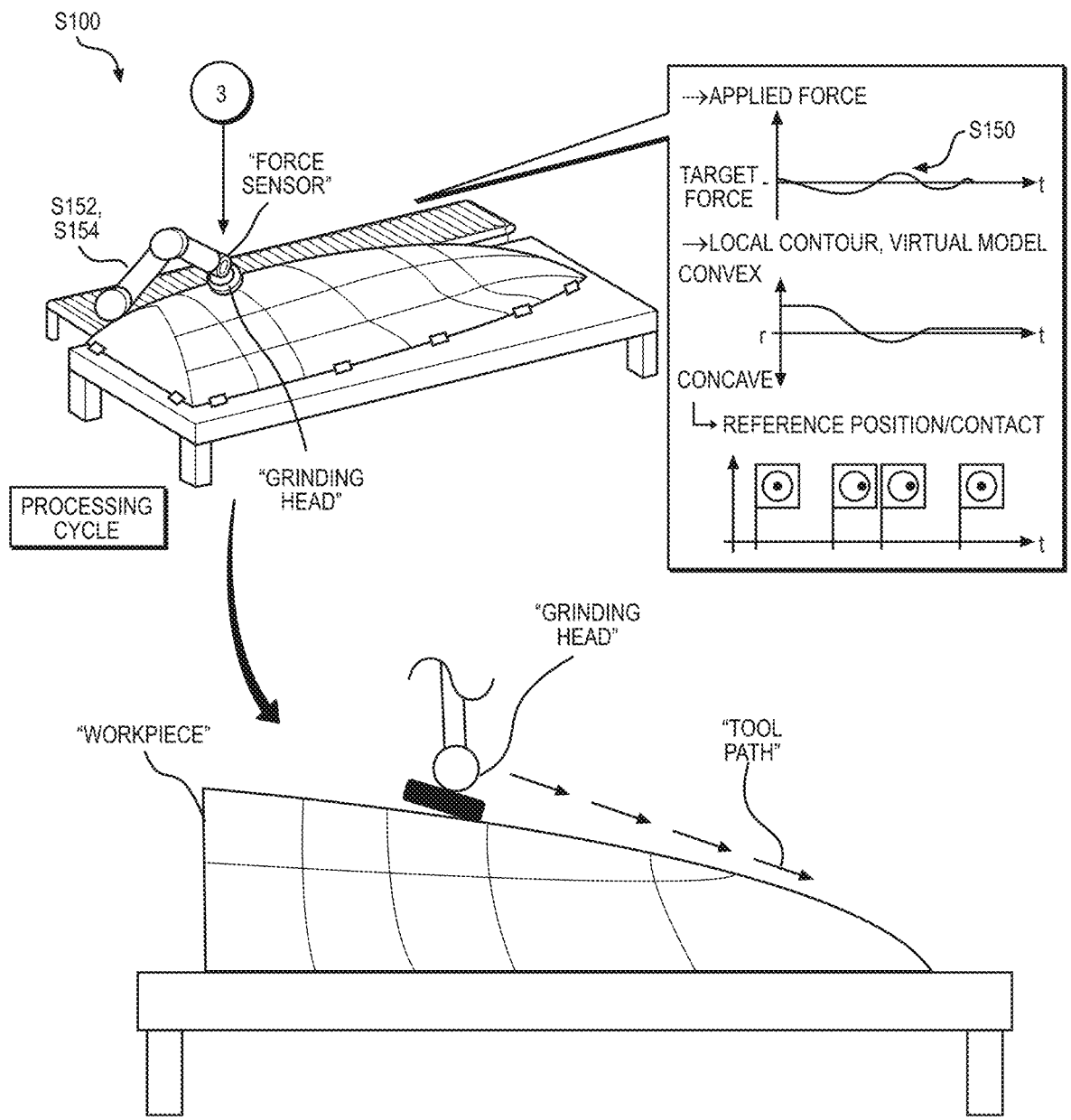
FIG. 3 is a flowchart representation of the method.

As shown in FIGS. 1, 2, and 3, a method S100 for autonomously grinding a workpiece includes: accessing a set of images captured by an optical sensor arranged on an end effector traversing a scan path over a workpiece during a scan cycle in Block S110; and compiling the set of images into a virtual model of the workpiece in Block S120.

The method S100 also includes: identifying a first grinding region on the workpiece in Block S130; and projecting a target grinding profile onto the first grinding region on the workpiece represented in the virtual model in Block S132, the target grinding profile defining final contour characteristics of the first grinding region.

The method S100 further includes: based on a geometry of the workpiece and the target grinding profile, generating a first tool path for removal of material from the first grinding region to the target grinding profile in Block S40; and assigning a first target force to the first grinding region in Block S142.

The method S100 also includes, during a processing cycle: accessing a first sequence of force values output by a force sensor coupled to a grinding head arranged on the end effector in Block S150; via a set of actuators coupled to the end effector, navigating the grinding head across the first grinding region according to the first tool path in Block S152 and, based on the first sequence of force values, deviating the grinding head from the first tool path to maintain forces of the grinding head on the first grinding region proximal the first target force in Block S154.

2. Applications

Generally, an autonomous scanning and grinding system (hereinafter the "system") can execute Blocks of the method S100: to autonomously capture scan data of a workpiece occupying a work cell during a rapid, contactless scan cycle; to compile the scan data into a virtual three-dimensional model exhibiting actual dimensional characteristics of regions across the workpiece; to project a target grinding profile defining final dimensional characteristics—of a processed (e.g., grinded) workpiece—onto a virtual region on the virtual model corresponding to an actual region (or "grinding region) of the workpiece; to generate a tool path spanning surfaces represented in the virtual model and defining a sequence of nominal positions and orientations traversable by a grinding head to grind (hereinafter "process") the actual region workpiece to the target grinding profile; and to assign a target force for application of the grinding head on the workpiece.

The system can further execute Blocks of the method S100: to track forces applied by the sanding to the workpiece; to advance and retract the grinding head normal to the workpiece while navigating the grinding head along the tool path to maintain forces applied by the grinding head to the workpiece at the target force and thus, remove material from a region on the workpiece—such as material from weld corners (e.g., fillet welds), gates (e.g., runners, sprues), and blemished surface (e.g., burns, scratches)—to approximate (e.g., between 95%-99.99% similarity) the region on the workpiece to the grinding profile.

More specifically, the system can: identify a grinding region (e.g., gate zone, weld corner) on a workpiece based on a marker (e.g., tape, paint) applied to a region on the workpiece by an operator handling the workpiece at the work zone; and, based on a geometry of the marker, access a target grinding profile associated with the grinding region on the workpiece. In particular, during a pre-grinding process, the system can: access a set of images from an optical sensor traversing a scan path over the workpiece; implement computer vision techniques (e.g., edge detection, object detection) to detect a marker (e.g., tape, paint) in a first image, in the set of images; project the marker onto a virtual region on the virtual model representing the workpiece; and, based on a geometry (e.g., linear streak, enclosed boundary) of the marker, identify the virtual region on the virtual model as corresponding to a grinding region (e.g., weld corner, gate zone) on the workpiece.

The system can then: access a target grinding profile—such as from a profile library containing a set of grinding profiles associated with regions of the workpiece—corresponding to the grinding region (e.g., weld corner, gate zone) defining final contour (e.g., dimension) characteristics of the grinding region following processing by the system; project the target grinding profile onto the virtual region on the virtual model representing the workpiece; characterize a scope of material removal from the grinding region based on a difference between actual dimensions of the grinding region defined in the virtual model and target final dimensions of the grinding region defined in the target grinding profile; and, generate a tool path for removal of material from the grinding region to the target grinding profile. The system can then, initiate the processing cycle: to autonomously navigate the grinding head across the workpiece according to the tool path, thereby removing material from the grinding region to approximate the target grinding profile; and to implement closed-loop controls to maintain a force applied by the grinding head to the workpiece at the target force by deviating the grinding head from the tool path normal to the adjacent surface represented in the virtual model.

In one example, the system can: detect a marker, on the workpiece, depicted in the image; project the marker onto a virtual region on the virtual model representing the workpiece; and, in response to a geometry of the marker corresponding to a linear streak marker across the workpiece, identify the virtual region on the virtual model as corresponding to a fillet weld on the workpiece. The system can then: access a target grinding profile associated with the fillet weld of the workpiece and defining a target throat thickness of the fillet weld; project the target grinding profile onto the virtual region on the virtual model representing the workpiece; characterize a scope of material removal from the fillet weld based on a difference between an actual throat thickness of the fillet weld defined in the virtual model and the target throat thickness of the fillet weld defined in the target grinding profile; and generate a tool path for removal of material from the fillet weld to the target throat thickness.

Accordingly, as described above, the system can: navigate the grinding head across the fillet weld on the workpiece according to the tool path, thereby removing material from the fillet weld to approximate the target throat thickness; and implement closed-loop controls to maintain a force applied by the grinding head across the fillet weld at the target force by deviating the grinding head from the tool path normal to the adjacent surface represented in the virtual model.

Therefore, the system can: identify a grinding region (e.g., welds, gates) on the workpiece; characterize a difference between actual dimensions of the grinding region on the workpiece represented in the virtual model and final dimensions of the grinding region specified in the grinding profile; derive a tool path for removal of material from the grinding region to the target grinding profile; and autonomously execute a processing cycle to navigate a grinding head according to this tool path, thereby approximating the processed grinding region on the workpiece to final dimensions of the grinding region specified in the target grinding profile.

3. System

In one implementation described in U.S. patent application Ser. No. 17/829,193 and shown in FIGS. 1, 3, and 5, the system includes: a robotic arm arranged in or adjacent a work zone and that includes a set of articulatable joints interposed between a series of arm segments; an end effector supported on a distal end of the robotic arm; a grinding head arranged on or integrated into the end effector and configured to actuate (e.g., rotate) a grinding pad (e.g., flap disc, sandpaper); an optical sensor (e.g., a set of depth sensors and/or color cameras) arranged on or integrated into the end effector and configured to capture optical images (e.g., depth maps, photographic color images) of a workpiece; a force sensor (e.g., a one-dimensional axial force sensor) configured to output a signal representing a force applied by the grinding head to a workpiece normal to the grinding head; a set of position sensors configured to output signals representing for assemblable into) a three-dimensional position of the end effector; a display configured to render a user interface accessible by an operator; and/or a controller configured to execute Blocks of the method S100.

In this implementation, the system can also include a conveyor configured to traverse the robotic arm longitudinally along the work zone, such as to reach and process an elongated part defining a high length-to-width ratio (e.g., a high aspect ratio), such as a boat hull or aircraft wing.

In another implementation, the system includes a multi-axis (e.g., five-axis) gantry configured to locate and articulate the end effector, grinding head, and optical sensor(s) across the work zone.

However, the system can include or define any other element or structure.

4. Workpiece Loading and Processing Limits

In one variation, as shown in FIG. 1, the system retrieves processing limits and/or other parameters for autonomously grinding the workpiece.

In particular, in preparation for autonomously processing (e.g., grinding) a workpiece by the system, an operator locates the workpiece in the work zone adjacent the system. For example, the operator may: load the workpiece onto a support rig (e.g., a wheeled table) and install intermittent clamps on the workpiece to retain the workpiece on the support rig; place the support rig and workpiece into the work zone; and lock wheels of the support rig.

The system can then prompt the operator to supply processing limits for the workpiece, such as including: a maximum applied force (i.e., a maximum force applied by the grinding head to any region on the workpiece); a maximum applied pressure (e.g., a maximum force applied by the grinding head to any unit area of the workpiece); and a maximum deformation of the workpiece (e.g., a maximum distance of a point on the workpiece in an unloaded position to a loaded position when the system applies the grinding head to the workpiece). For example, the operator can supply these processing limits based on known strengths and compliance characteristics of the workpiece.

Additionally or alternatively, the system can retrieve these processing limits from a predefined processing profile. For example, the system can select a predefined processing profile stored in a processing profile database based on: a material of the workpiece (e.g., fiberglass, steel, aluminum) and/or a nominal wall thickness of the workpiece selected by the operator; or a length, aspect ratio, and/or a geometry profile of the workpiece (e.g., concave with high aspect ratio, convex with high aspect ratio, concave with low aspect ratio, convex with low aspect ratio) entered by the operator or derived from a scan of the workpiece completed by the system. The system can then load processing limits extracted from this processing profile.

However, the system can retrieve or load processing limits for the workpiece based on any other data supplied by the operator or collected autonomously by the system during a scan cycle as described below.

5. Target Model

Generally, the system can access (or "ingests," loads) a target model containing a three-dimensional representation of the workpiece and containing or annotated with dimensions, geometric callouts, and/or dimensional tolerances specified for individual surface, edges, and/or vertices on the workpiece upon completion of a processing cycle on the workpiece. More specifically, the system can access a target model containing geometric and dimensional specifications for the workpiece following completion of an upcoming processing cycle. The system then executes subsequent Blocks of the method S100 to traverse the grinding head across select regions of the workpiece to remove material and to bring the workpiece in conformity with these geometric and dimensional specifications for the workpiece defined in the target model.

Figure 4:
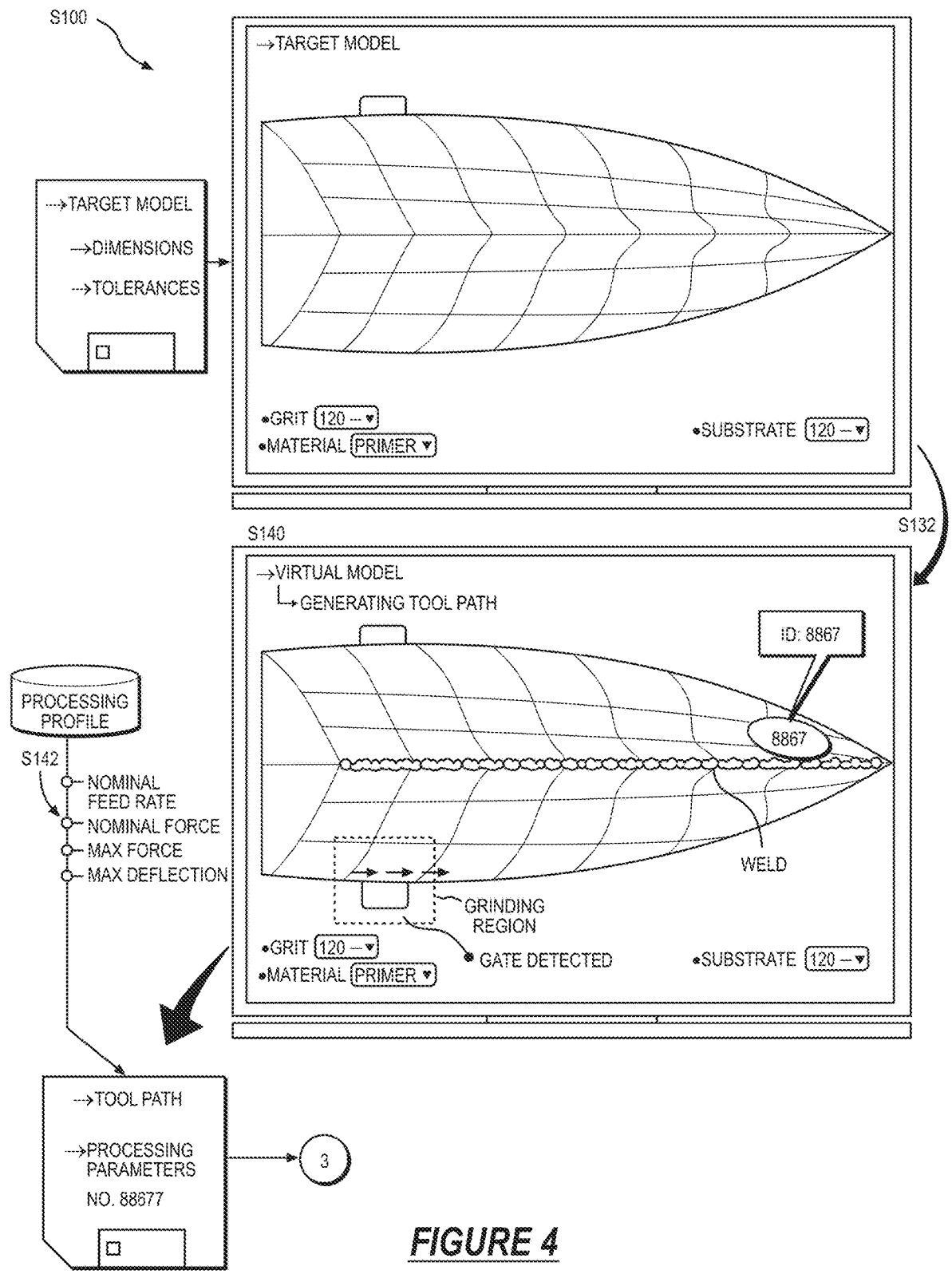
FIG. 4 is a flowchart representation of the method.

In one implementation, as shown in FIG. 4, the system accesses a target model containing a three-dimensional computer-aided drafting model representing target dimensions of surfaces of the workpiece. For example, the target model can include: a solid model defining a volume between virtual internal and external surfaces of the workpiece; or a mesh defining target interior and/or exterior surfaces of the workpiece. In this example, target model can also include geometric and dimensional callouts, such as tagged to or annotated on individual surfaces, edges, and/or vertices directly within the target model.

In one implementation, an operator can upload the toolpath to the system manually in preparation for processing the workpiece. Alternatively, the system can automatically retrieve the target model, such as by: detecting an Identifier on the workpiece during a scan cycle executed by the system once the workpiece is loaded into a work zone adjacent the robotic arm; locating the target model, associated with this identifier, in the database; and then loading a local copy of this target model from the database.

However, the system can access a virtual model and geometric and dimensional specifications for the workpiece in any other format, at any other time, and responsive to any other trigger or input.

6. Part Scan

Blocks S110 and S120 of the method S100 recite: navigating an end effector over a workpiece; accessing a set of images captured by an optical sensor arranged on the end effector while traversing the workpiece; and compiling the set of images into a virtual model representing unloaded surfaces of the workpiece. Generally, in Blocks S100 and S120, the system can Implement methods and techniques described in U.S. patent application Ser. No. 17/829,193 to: autonomously navigate an optical sensor (e.g., a depth sensor and/or a color camera) over the workpiece; capture optical images (e.g., depth maps, photographic color images) of the workpiece; and assemble these optical images into a virtual three-dimensional model that represents surfaces of the workpiece within a wide dimensional tolerance (e.g., +/−0.15") as shown in FIG. 1.

For example, after the operator loads the workpiece into the work zone and confirms processing limits for the workpiece, the system can initiate a scan cycle. During the scan cycle, the system can: navigate the optical sensor-located on the end effector-along the scan path over and offset above the workpiece; monitor a distance between the end effector and the workpiece based on depth data collected by the optical sensor; and implement closed-loop controls to maintain a target offset distance between the optical sensor and the workpiece (e.g., 20", 50 centimeters). In this example, for a workpiece defining an elongated geometry including a long axis located approximately parallel to a longitudinal axis of the work zone, the system can actuate a conveyor supporting the robotic arm to traverse the robotic arm along the longitudinal axis of the work zone while rastering the end effector and the optical sensor laterally across the work zone to capture a sequence of optical images representing all surfaces of the workpiece accessible by a grinding head on the end effector.

The system can thus capture scan data—such as color photographic images, stereoscopic Images, depth maps, and/or LIDAR images—from a set of optical sensors arranged on the end effector while traversing the end effector across (e.g., over and not in contact with) the workpiece. For example, the system can capture depth maps at a rate of 2 Hz while traversing the end effector across the workpiece at a rate of three feet per second at a target offset distance of three feet between the effector and the workpiece which corresponds to a nominal sensor field of view of three feet by three feet and thus yields approximately 50% overlap between consecutive depth maps captured by the system during the scan eye.

The system then compiles these optical images into a virtual three-dimensional model of the workpiece as described in U.S. patent application Ser. No. 17/829,193 such as by implementing structure-from-motion techniques or by fusing these optical images into the virtual model based on poses of robotic arm when these optical images d. For example, the system can compile this set of optical images into a three-dimer mesh within a virtual three-dimensional space.

However, the system can implement any other methods or techniques to navigate the end effector and optical sensor over the workpiece, to collect optical images of the workpiece, and to generate a virtual three-dimensional model of the workpiece based on these optical images.

7. Identifying Grinding Regions

Block S130 of the method S100 recites identifying a first grinding region on the workpiece. Generally, in Block S130, the system can: autonomously detect a marker (e.g., tape, paint) arranged on the workpiece defining a grinding region on the workpiece; or manually receive selection of a grinding region on the workpiece, such as by receiving selection—at an operator portal associated with an operator—of a grinding region in the virtual model representing the workpiece. More specifically, the system can: navigate the optical sensor traversing a scan path across the workpiece; access an image captured by the optical sensor traversing the scan path; detect a marker, depicted in the image, corresponding to a grinding region on the workpiece; and identify the grinding region on the workpiece, such as based on characteristics (e.g., geometric characteristics, reflective characteristics, color characteristics) of the marker detected in the image. Thus, the system can autonomously and/or manually identify griding regions on the workpiece for removal of material (e.g., metal) during a processing cycle.

7.1 Markers

In one implementation, as shown in FIGS. 1 and 2, the marker includes a material (e.g., tape, paint), different from the material (e.g., metal) of the workpiece, attached or adhered to the workpiece. For example, the marker can include tape applied to the surface by an operator of the system in a target arrangement configured to bound a region on the workpiece for selective processing. In another example, the marker can include an ink—stamped or drawn onto the workpiece—exhibiting a different color (e.g., green, red) and/or reflectivity than the workpiece. In yet another example, the marker can include a streak—such as stamped or drawn onto the workpiece—across a weld, corner, or blemish on the workpiece. In yet another example, the marker can include a geometry (e.g., O-shape, X-Shape) corresponding to a particular grinding region (e.g., weld grinding, gate grinding) of the workpiece.

In one implementation, the system can: navigate the optical sensor along a scan path across the workpiece; access a set of images captured by the optical sensor traversing along the scan path; extract a set of visual features from a first image in the set of images; and implement computer vision techniques (e.g., edge detection, object detection) to identify the marker arranged on a region on the workpiece based on the set of visual features. In one example, as described above, the marker corresponds to a boundary (e.g., taped boundary) applied to a region on the workpiece by an operator.

Accordingly, the system can then: based on a geometry (e.g., circular shape) of the marker corresponding to the boundary depicted in the image, project the marker (i.e., boundary) onto the virtual model representing the workpiece; and derive a coordinate location bounded by the marker of a virtual region corresponding to the grinding region on the workpiece. The system can then: generate a callout defining geometric characteristics (e.g., surface contour, dimensions) for the coordinate location encompassing the virtual region; annotate the virtual region as a grinding region in the virtual model; and annotate the callout to the virtual region in the virtual model.

In another implementation, the system can: access a color image captured by a color camera traversing along the scan path over the workpiece; extract a set of visual features from the color image; and, as described above, implement computer vision techniques to identify a marker on the workpiece characterized by a particular marker color and a particular marker geometry. In this implementation, the system can further implement template matching techniques to identify the grinding region on the workpiece according to the particular marker color and the particular marker geometry of the marker detected on the workpiece. In one example, the marker—applied onto the workpiece by the operator—defines a streak arranged proximal or directly to a weld corner (e.g., fillet weld) of the workpiece.

Accordingly, the system can: project the marker (e.g., the streak) onto a virtual region on the virtual model representing the workpiece based on the color image; implement template matching techniques to correlate a linear geometry and a color of the marker to a weld grinding region on the workpiece; and annotate the virtual region on the virtual model as the weld grinding region on the workpiece.

In another example, the marker—applied onto the workpiece by the operator—is characterized by a particular geometry (e.g., X-shape) and arranged across an area of the workpiece containing blemishes (e.g., scratches, burns, pits, waves).

Accordingly, the system can: implement template matching techniques to correlate the particular geometry (e.g., X-shape) of the marker to an area of the workpiece containing blemishes; and, in response to identifying the blemish marker, implement computer vision techniques (e.g., object segmentation) to identify a set of blemishes (e.g., scratches, burns) depicted in the color image. The system can then: project the marker (e.g., X-shape) onto the virtual region on the virtual model representing the workpiece; annotate areas—within the virtual region—corresponding to the set of blemishes (e.g., stretches, burns) identified in the image; and annotate the virtual region as the grinding region in the virtual model.

Therefore, the system can: detect a set of markers—applied onto the workpiece by an operator—across the workpiece; and autonomously identify grinding regions across the workpiece based on characteristics (e.g., geometric characteristics, color characteristics) of the set of markers arranged across the workpiece.

7.2 Reference Model+Virtual Model

In one implementation, the system can—as described in U.S. patent application Ser. No. 18/232,275—detect a difference between a surface contour in the virtual model representing the workpiece and a target surface contour, corresponding to the surface contour, defined in the target virtual model. In this implementation, the system can: detect differences between surface contours represented in the virtual model (or in discrete surface contours generated by the system) and target surfaces specified and defined in the target virtual model; characterize these differences, such as magnitudes of dimensional differences or qualities of geometric differences; and flag each surface contour in the virtual model that deviates from its corresponding target surface in the target virtual model by more than a geometric or dimensional tolerance specified in the target virtual model for the corresponding target surface.

In one implementation, as shown in FIG. 4, the system can: detect a difference between a first surface contour in the virtual model and a target surface contour corresponding to the surface contour, defined in the target virtual model; generate a spatial model representing the difference between the first surface contour and the target surface contour; and implement template matching techniques to correlate the spatial model to a gate (sprue, runner, overflow) arranged on the first surface contour in the virtual model. The system can then: generate a callout defining geometric characteristics (e.g., surface contour, dimensions) for the gate according to the spatial model; annotate the first surface contour in the virtual model as corresponding to the grinding region; and annotate the gate located on the first surface contour with the callout.

Therefore, the system can: detect differences between a virtual model representing the workpiece and a target virtual model representing a processed final workpiece; based on these differences, characterize surface contours in the virtual model as corresponding to a gate (e.g., sprue, runner); and autonomously identify these surface contours as grinding regions for the workpiece.

7.3 Receiving Grinding Region Selection

In one implementation, the system can manually receive selections of grinding regions from an operator interfacing with an operator portal presenting the virtual model to the operator. More specifically, the system can: generate a prompt requesting an operator to annotate a virtual region on the virtual model representing the workpiece; serve the prompt and the virtual model to an operator portal associated with an operator assigned to oversee processing of the workpiece; and, at the operator portal, receive selection (i.e., from the operator) of a virtual region on the virtual model as corresponding to a grinding region for the workpiece.

For example, the operator can: annotate a first virtual region in the virtual model as corresponding to a first grinding region defining a weld corner (e.g., fillet weld) of the workpiece; annotate a second virtual region in the virtual model as corresponding to a second grinding region defining a gate (e.g., runner, sprue) of the workpiece; and annotate a third virtual region in the virtual model as corresponding to a third grinding region defining a blemished region on the workpiece. Therefore, the system can: manually receive operator annotations to virtual regions of the virtual model representing the workpiece; and identify grinding regions on the workpiece according to these annotated virtual regions in the virtual model.

8. Target Grinding Profile

Block S132 of the method S100 recites projecting a target grinding profile-defining final contour characteristics (e.g., surface finish, dimensions)—onto the first grinding region on the workpiece represented in the virtual model. Generally, in Block S132, the system can: identify a target grinding profile associated with the grinding region on the workpiece; generate a spatial representation of the grinding region according to final contour characteristics (e.g., dimensions) defined in the target grinding profile; and project the spatial representation onto the grinding region on the workpiece represented in the virtual model. Thus, the system can: identify a difference between contour characteristics (e.g., dimensions, surface finish) of the actual grinding region on the workpiece represented in the virtual model and contour characteristics (e.g., dimensions, surface finish) of target contour characteristics (e.g., dimensions, surface finish) of the spatial representation representing the grinding region following processing (e.g., grinding) by the system; and characterize the difference as a target scope of material removal from the grinding region during a processing cycle that results in the target grinding profile.

8.1 Grinding Specification

In one implementation, as shown in FIG. 1, the system can: access a profile library containing a set of grinding profiles associated with final contour characteristics of regions of the workpiece; and query the profile library to identify a grinding profile corresponding to a coordinate location of a selected virtual region (i.e., the grinding region) on the virtual model representing the workpiece. The system can then: generate a spatial representation according to the coordinate location of the selected virtual region and the contour characteristics (e.g., dimensions) defined in the grinding profile; generate a callout (e.g., dimension callout) of the spatial representation according to the contour characteristics; and annotate the spatial representation with the callout.

In one implementation, the system can implement part scan techniques, as described above, generate a grinding profile for a region on a workpiece based on a processed (e.g., grinded) workpiece by the system and/or processed (e.g., grinded) manually by an operator. In this implementation, in preparation for a scan cycle, the operator may locate the processed workpiece in the work zone adjacent the system. As described above, the system can: navigate the optical sensor arranged on an end effector along a scan path across the workpiece; access a set of images captured by the optical sensor traversing the scan path; and compile the set of images into a virtual model of the processed workpiece.

The system can then segment the virtual model representing the processed workpiece into a set of virtual regions corresponding to actual regions on the processed workpiece. The system can then, for each virtual region, in the set of virtual regions: extract a set of contour characteristics (e.g., dimensions) from the virtual region corresponding to actual contour characteristics of an actual region on the processed workpiece; generate a spatial representation of the virtual region according to the set of contour characteristics (e.g., dimensions) from the virtual region; and store the spatial representation of the virtual region as a target grinding profile, such as in a profile library stored in a remote computer system, corresponding to an actual region on an un-processed workpiece.

In one variation of the aforementioned implementation, the system can, for each virtual region in the set of virtual regions: extract a set of contour characteristics (e.g., dimensions) from the virtual region corresponding to actual contour characteristics of an actual region on the processed workpiece; and annotate the virtual region in the target virtual model with the set of contour characteristics (e.g., dimensions, surface finish). Accordingly, the system can then store the annotated target virtual model as the grinding specification corresponding to the workpiece, such as in a model library stored in a remote computer system.

Therefore, the system can: as described above, identify a grinding region on the workpiece; and access a target grinding profile corresponding to the grinding region on the workpiece and defining final contour characteristics of the grinding region following processing (e.g., grinding) by the system.

8.2 Grinding Profile Projection

In one implementation, as shown in FIGS. 2 and 4, the system can: access a grinding specification corresponding to the workpiece, such as a profile library containing a set of grinding profiles corresponding to the workpiece, or a target virtual model defining final contour characteristics of the workpiece; as described above, identify a grinding region on the workpiece; extract a target grinding profile associated with the grinding region from the grinding specification and defining a set of target dimensions for the grinding region; and project the set of target dimensions onto the grinding region on the workpiece represented in the virtual model. The system can then: detect a difference between an actual set of dimensions of the grinding region on the workpiece represented in the virtual model and the target set of dimensions specified in the target grinding profile; characterize the difference as a target scope of material removal from the grinding region that results in the target set of dimensions across the grinding region on the workpiece; and, as described below, leverage the target scope of material removal to generate a tool path for the grinding head to remove material from the grinding region on the workpiece according to the target grinding profile.

In one implementation, the system can: as described above, detect a marker—corresponding to a grinding region on the workpiece—characterized by a particular marker geometry and a particular color; extract a target grinding profile from the grinding specification according to the particular marker geometry and the particular marker color of the marker corresponding to the grinding region; and project the target grinding profile onto the grinding region on the workpiece represented in the virtual model.

For example, the system can: detect a first streak marker—corresponding to a first weld corner on the workpiece—characterized by a first thickness and a first color (e.g., green); characterize the first weld corner as a corner joint according to the first thickness of the first streak marker; and, based on the first marker color (e.g., green), identify a first target grinding profile characterizing target contour dimensions for a flat grind along the corner joint of the first weld corner. Accordingly, the system can then: project the target contour dimensions for the flat grind onto the corner joint of the workpiece represented in the virtual model; detect a difference between actual contour dimensions of the corner joint represented in the virtual model and the target contour dimensions for the flat grind projected onto the corner joint; and characterize a first target scope of material removal from the corner joint that results in the flat grind along the corner joint.

In another example, the system can: detect a second streak marker—corresponding to a second weld corner on the workpiece—characterized by a second thickness, different from the first thickness, and a second color (e.g., red) distinct form the first color (e.g., green); characterize the second weld corner as a lap joint according to the second thickness of the second streak marker; and, based on the second marker color (e.g., red), identify a second target grinding profile, different from the first target grinding profile, characterizing target contour dimensions for a concave grind along the lap joint of the second weld corner. Accordingly, the system can then: project the target contour dimensions for the concave grind onto the lap joint of the workpiece represented in the virtual model; detect a difference between actual contour dimensions of the lap joint represented in the virtual model and the target contour dimensions for the concave grind projected onto the lap joint; and characterize a second target scope of material removal from the lap joint that results in the concave grind along the lap joint.

Therefore, the system can: project a target grinding profile onto a grinding region on a workpiece represented in the virtual model; and, based on a difference between actual contour characteristics of the grinding region on the workpiece and target contour characteristics defined in the target grinding profile, characterize a scope of material removal from the grinding region that results in the target grinding profile across the grinding region on the workpiece.

8.3 Example: Weld Grinding Projection

In one example, the system can: detect a marker, arranged proximal a first grinding region on the workpiece, depicted in a first image captured by an optical sensor traversing a scan path over the workpiece; and, based a geometry of the marker, identify the first grinding region as corresponding to a first fillet weld on the workpiece, and access—from a profile library—the target grinding profile associated with the first fillet weld and characterized by a target throat thickness for the first fillet weld. Additionally, the system can: identify a first actual fillet thickness of the first fillet weld of the workpiece represented in the virtual model; project the target throat thickness onto the first fillet weld on the workpiece represented in the virtual model; identify a difference in dimension between the first actual fillet thickness of the first fillet weld of the workpiece; and, based on the difference in dimension, characterize a first scope of material removal from the first grinding region that results in the target fillet thickness along the first weld corner of the workpiece. The system can then, as described below, based on the difference between the first throat thickness and the target throat thickness of the first fillet weld represented in the virtual model, generate the first tool path to remove material-according to the first scope of material removal— from the first fillet weld to the target throat thickness.

8.4 Example: Gate Grinding Projection

In one example, the system can: access a reference virtual model corresponding to the workpiece and representative of the workpiece at a target surface finish; and, based on a difference between the reference virtual model and the virtual model of the workpiece, identify a first grinding region on the workpiece as corresponding to a first gate zone including a first gate (e.g., runner, sprue). Additionally, the system can: extract, from the reference virtual model, a target grinding profile associated with the first gate zone and characterized by target surface finish of the first gate zone; project the target surface finish onto the first gate zone, including the first gate (e.g., runner, sprue), on the workpiece represented in the virtual model; identify a difference in dimension between the first gate zone including the first gate (e.g., runner, sprue) and the target surface finish defined in the target grinding profile; and, based on the difference in dimension, characterize a first scope of material removal from the first grinding region that results in the target surface finish across the first gate zone of the workpiece. As described below, based on the difference of a geometry of the first gate across the first gate zone and the target surface finish represented in the virtual model, the system can then, generate the first tool path to remove material (i.e., the first gate) from the first gate zone to the target surface finish.

9. Target Force Parameters

Block S142 of the method S100 recites: assigning a first target force to the first workpiece region. Generally, in Block S142, the system assigns target forces to workpiece regions of the workpiece, such as: based on autonomously-detected, manually-indicated, or derived (e.g., interpolated) maximum compliance (or minimum stiffness) characteristics of these regions; based on geometries (e.g., concave and convex contours, profiles) in these regions of the workpiece; and/or based on a material or part type of the workpiece.

In one implementation, the system retrieves a single target force from the predefined processing profile described above and assigns this target force to the entire workpiece, as shown in FIG. 1.

In another Implementation, the system defines boundaries between contiguous regions of the workpiece exhibiting similar contours, such as between contiguous concave, convex, and approximately flat regions of the workpiece spanning more than a minimum surface area (e.g., four square feet). The system then assigns target forces to each region, such as: highest forces in concave regions that may be least susceptible to plastic deformation due to high force application by the grinding head; moderate forces in flat regions that may more susceptible to plastic deformation due to force application by the grinding head; lowest forces in convex regions that may be most susceptible to plastic deformation due to high force application by the grinding head; and/or force magnitudes within a region proportional to the smallest radius within the region. The system can also annotate these regions and corresponding target forces in the virtual model of the workpiece.

In one example, the system can access a set of characteristics corresponding to a base metal of the workpiece and, based on the set of characteristics: assign the first target force to the first grinding region; and assign the set of grinding parameters to the first grinding region, such as a nominal feed rate for navigating the grinding head over the workpiece, a nominal stepover distance across the workpiece, and a nominal offset angle between an axis of the grinding head and a normal vector per unit area on the workpiece.

Additionally or alternatively, the system can: access or retrieve a compliance characteristic of a compliant backing arranged on the grinding head and supporting a grinding pad; and calculate (or adjust) a target force for a region on the workpiece proportional to this compliance characteristic. Thus, because a grinding head configured with a more compliant (i.e., less stiff) backing may distribute an applied force over a wider area of the workpiece in contact with the grinding pad, the system can a higher target force to each region on the workpiece.

9.1 Workpiece Segmentation

In one variation the system segments the workpiece into workpiece regions, such as based on: geometries of the workpiece represented in the virtual model; compliance of the workpiece derived autonomously by the system as described below; and/or compliance annotations supplied by the operator, as described below. The system can then define a toolpath and assign a target force within each workpiece region.

For example, the system can: define a first workpiece region containing a contiguous convex surface; define a second workpiece region containing a contiguous concave surface; and define a third workpiece region containing a contiguous surface approximating a planar geometry (e.g., defining a large effective radius); etc. In another example, the system can: define a first contiguous workpiece region characterized by high detected, predicted, or annotated stiffness; define a second contiguous workpiece region characterized by moderate detected, predicted, or annotated stiffness; and define a third contiguous workpiece region characterized by low detected, predicted, or annotated stiffness; etc.

However, the system can segment the workpiece in any other way and according to any other workpiece characteristics.

10. Tool Path Generation

The system can further implement methods and techniques described in U.S. patent application Ser. No. 17/829,193 to define a toolpath within each region on the workpiece.

In one implementation, as shown in FIGS. 2 and 4, the system sets a first feed rate for the first region proportional to the target force assigned to the first region. The system also sets a first stepover distance between segments of a first toolpath for a first region on the workpiece: based on (e.g., proportional to) the target force assigned to this region on the workpiece; and/or proportional to a minimum radius within the first region on the workpiece. The system then: defines a serpentine or boustrophedonic toolpath within the first region on the workpiece according to the nominal stepover distance; and stores this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region on the workpiece represented in the virtual model, which represents the workpiece in unloaded form. The system can then extract a three-dimensional position and normal vector of each vertex or other point on the first toolpath from the virtual model. Accordingly, the system can store the first toolpath as a first ordered sequence of keypoints: located on a first unloaded surface of the workpiece stored in (i.e., represented by) the virtual model; and contained within the first workpiece region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion on the workpiece and a target force less than the nominal target force within a convex subregion on the workpiece.

The system can repeat this process for each other region on the workpiece.

Alternatively, the system can implement the foregoing methods and techniques to generate a single continuous toolpath spanning the entire workpiece for an entire surface of the workpiece selected for autonomous processing by the system).

10.1 Tool Path+Material Removal

Block S140 of the method S100 recites, based on a geometry of the workpiece and the target grinding profile, generating a first tool path for removal of material from the first grinding region to the target grinding profile. Generally, in Block S140, the system can: based on a difference between the geometry of the workpiece and the target grinding profile, characterize a target scope of material removal from the grinding region; and generate a tool path according to the target scope of material removal that results in the target grinding profile across the grinding region following processing (e.g., grinding) of the workpiece.

In one implementation, as shown in FIG. 2, the system can: as described above, detect a marker on the workpiece; calculate a boundary of a first grinding region based on a coordinate location bounded by the marker of a virtual region on the virtual model; and, based on a difference between the geometry of the workpiece and the target grinding profile, define a sequence of tool path coordinates within the boundary of the grinding region on the workpiece to remove material from the grinding region to the target grinding profile. Accordingly, the system can then navigate the grinding head along the sequence of tool path coordinates within the boundary of the first grinding region.

In one implementation, the system can: characterize a target scope of material removal from the grinding region based on a difference between the geometry of the workpiece and the target grinding profile; and, based on the target scope of material removal from the grinding region, generate a tool path defining a grinding method (e.g., peripheral cut, plunge cut, traverse cut, form cut, profile cut) for removing material from the grinding region.

For example, the system can: characterize a target scope of material removal from a grinding region corresponding to a corner weld based on a difference between actual dimensions of the corner weld and target dimensions of the corner weld specified in the target grinding profile; and, based on the target scope of material removal from weld corner, generate a tool path defining a concave cut for removing material from the weld corner. In another example, the system can: characterize a scope of material removal from a grinding region corresponding to a gate zone, including a gate (e.g., runner, sprue), based on a difference between actual dimensions of the gate zone and target dimensions of the gate zone specified in the target grinding profile; and, based on the target scope of material removal from the gate zone, generate a tool path defining a straight cut for removing material (i.e., the gate) from the gate zone.

In one implementation, the system can: define a first set of roughing passes in the tool path for removing a first scope of material from the grinding region; and define a second set of finishing passes in the tool path for removing a second scope of material, less than the first scope of material, from the grinding region. Accordingly, the system can: during first time period in the processing cycle, navigate the grinding head according to the set of roughing passes to remove the first scope of material from the grinding region; and, during a second time period following the processing cycle, navigate the grinding head according to the set of finishing passes to remove the second scope of material from the grinding region.

In one example, the system can: as described above, assign a first target force to the grinding region; set a first feed rate for the set of roughing passes proportional to the first target force assigned to the grinding region; and set a first stepover distance for the set of roughing passes proportional to the first target force assigned to the grinding region. The system can then: navigate the grinding head across the grinding region on the workpiece according to the set of rouging passes of the tool path to remove a first scope of material from the grinding region.

Additionally, in this example, the system can: following navigation of the grinding head along the set of roughing passes of the tool path, assign a second target force to the grinding region less than the first target force; set a second feed rate, less than the first feed rate, for the set of finishing passes of the tool path proportional to the second target force assigned to the grinding region; and set a second stepover distance for the set of finishing passes proportional to the second target force assigned to the grinding region. The system can then navigate the grinding head across the grinding region on the workpiece according to the set of finishing passes of the tool path to remove a second scope of material from the grinding region.

Therefore, the system can: generate a tool path defining a set of roughing passes and a set of finishing passes for removal of a target scope of material from the grinding region that results in the grinding profile across the grinding region; and navigate a grinding head across the grinding region on the workpiece to remove the target scope of material from the grinding region.

11. Pre-processing Cycle

In one implementation, during a pre-processing cycle preceding the processing cycle, the system can: as described above, assign a target force to the grinding region on the workpiece; access a set of nominal parameters (e.g., feed rate, stepover distance, torque) for the tool path; and navigate the grinding head, at the target force, across the grinding region according to a first roughing pass of the first tool path and the set of nominal parameters. The system can then: following the first roughing pass, access a first image captured by the optical sensor arranged on the end effector over the grinding region; implement computer vision techniques to extract a set of visual features from the first image; and, based on the set of visual features, interpret a first scope of material removal (e.g., 0.020 inches cubed) from the first grinding region following the first roughing pass in the tool path.

Accordingly, the system can then: predict a sequence of roughing passes to remove a target scope of material (e.g., 0.3 inches cubed) from the grinding region based on the first scope of material (e.g., 0.020) removed during the first roughing pass; and set the sequence of roughing passes to the tool path for removing material from the grinding region. For example, for a first roughing pass that removes 0.020 inches cubed of material, the system can set a sequence of fifteen roughing to the tool path to remove a target scope of 0.3 inches cubed of material from the grinding region.

Additionally or alternatively, the system can modify parameters of the tool path to increase and/or decrease the scope of material removal from the grinding region during a single roughing pass. For example, the system can: modify grinding parameters (e.g., feed rate, torque, cut angle) to increase energy output toward the grinding region, which in turn results in a greater scope of material removal from the grinding region during a single roughing pass; and modify grinding parameters (e.g., feed rate, torque, cut angle) to decrease energy output toward the grinding region, which in turn results in less scope of material removal from the grinding region during a single roughing pass.

The system can then, during the processing cycle, navigate the grinding head across the grinding region according to the sequence of roughing passes of the tool path for the grinding region.

12. Processing Cycle

Block S150 of the method S100 recites accessing a first sequence of force values output by a force sensor coupled to a grinding head arranged on the end effector. Blocks S152 and S154 of the method S100 recite, via a set of actuators coupled to the end effector: navigating the grinding head across the first workpiece region according to the first toolpath; and, based on the first sequence of force values, deviating the grinding head from the first toolpath to maintain forces of the grinding head on the first workpiece region proximal the first target force.

Generally, Blocks S150, S152, and S154 of the system can implement methods and techniques described in U.S. patent application Ser. No. 17/829,193 to autonomously navigate the grinding head along a toolpath (e.g., a sequence of keypoints) defined within a region on the workpiece and to maintain a t get normal force between the grinding head and the workpiece by selectively moving the grinding head into and away from the workpiece normal to the surface of the workpiece represented in the virtual model as shown in FIG. 3.

The system also implements closed-loop controls to maintain a target force between the grinding head and the workpiece within each workpiece region—based on force values read from the force sensor integrated into the grinding head—by driving the grinding head toward and away from the workpiece along vectors normal to the workpiece, such as represented in keypoints of these toolpaths or extracted from the virtual model during the processing cycle. For example, for a first keypoint in the first ordered sequence of keypoints, the system can drive the set of actuators to: locate the grinding head at a first three-dimensional position intersecting the first keypoint; align an axis of the grinding head to a first vector associated with the first keypoint; and drive the grinding head, coaxial with the first vector, toward the workpiece to match force values, in a sequence of force values read from the force sensor in the grinding head, to a first target force assigned to a first toolpath containing the first keypoint. The system can then drive the set of actuators to interpolate a three-dimensional path and grinding head orientation from the first keypoint to the second keypoint while implementing closed-loop controls to apply the grinding head to the workpiece with the first target force. The system can repeat this process for each other keypoint defined along the first toolpath and then along subsequent toolpaths defined for other regions of the workpiece.

In a similar implementation, in Block S140, the system defines a first ordered sequence of keypoints located on the virtual model. For each keypoint in the first ordered sequence of keypoints, the system: calculates a vector normal to the virtual model at a location of the keypoint on the virtual model; and stores the vector in the keypoint. The system then stores the first ordered sequence of keypoints as the first toolpath. Then, for a first keypoint in the first ordered sequence of keypoints, the system: locates the grinding head at a first position intersecting the first keypoint in Block S152; aligns an axis of the grinding head to a first vector associated with the first keypoint; and drives the grinding head, coaxial with the first vector, toward the workpiece to match force values, in the first sequence of force values read from the force sensor, to the first target force in Block S154.

12.1 Contact Position Derivation

Generally, the system can track three-dimensional positions of a reference point on the grinding head in contact with the workpiece in real space (hereinafter a "contact point"). In one implementation, the system derives a three-dimensional position of the end effector—while occupying a keypoint in the toolpath-based on: positions of each joint or actuator in the robotic arm; the position of the conveyor supporting the robotic arm; and a fixed or derived offset between the end effector and a reference point on a grinding pad supported on the grinding head.

In one implementation the system generates the toolpath containing a sequence of keypoints, each keypoint defining a vector normal to the surface represented in the virtual model at the location of the keypoint. During the processing cycle, the system traverses the grinding head along the toolpath by: interpolating normal vectors between keypoints; and maintaining the axis of the grinding head (e.g., the rotational axis of the grinding head) coaxial with normal vectors defined at and interpolated between keypoints along the toolpath. Accordingly, the system can maintain a point (or a relatively small area) on the grinding pad—proximal the axis of the grinding head—in contact with the workpiece, such as: for all convex surfaces; for all planar surfaces; and for all concave surfaces characterized by radii greater than a minimum radius controlled by compliance of a compliant backing supporting the grinding pad on the grinding head. Therefore, in this implementation, the system can record a sequence of coordinate measurements on the workpiece based on a reference point on the grinding head coincident the rotational axis of the grinding bead.

In one variation, during the processing cycle, the system: defines a target axis parallel and offset from the axis of the grinding head by a target offset distance; and implements methods and techniques described above to maintain the target axis coaxial normal vectors defined at and interpolated between keypoints along the toolpath. Accordingly, the system can maintain a reference point on the grinding pad—offset from the axis of the grinding head—in contact with the workpiece. Therefore, in this Implementation, the system can record a sequence of coordinate measurements on the workpiece based on a reference point on the grinding head offset from the rotational axis of the grinding head based on the target offset distance. In this variation, the system can also set a fixed target offset distance, such as 50% of the radius of the grinding pad.

Alternatively, in this variation, the system can set this target offset distance for a region on the workpiece based on a geometry of the workpiece, such as inversely proportional to an effective radius of the workpiece region such that this target offset: is approximately null for planar workpiece regions; 90% of the radius of the grinding pad for convex workpiece regions characterize by small radii; and 100% of the radius of the grinding pad for concave workpiece regions characterized by radii less than the radius of the grinding pad. Additionally or alternatively, in this variation, the system can dynamically adjust this target offset distance, such as maintaining consistent wear across the grinding pad during the processing cycle.

Accordingly, the system can: define a target axis parallel to the rotational axis of the grinding head; maintain the target axis normal to workpiece—as represented in the virtual model—while traversing the grinding head across the workpiece; and track and record real three-dimensional positions (or "coordinate measurements") of a reference point on the grinding pad coincident this target axis. For example, the system can record and store three-dimensional positions of the reference point at a pitch distance of 0.10" along the toolpath.

12.1.8 Contact Point by Workpiece Surface Profile

In one example of the foregoing variation, the system: isolates a first workpiece region defining a convex surface profile in the virtual model; generates a first toolpath defining a first continuous path across this first workpiece region on the workpiece in Block S140; sets a first target offset distance of null (i.e., 0.0") for the first workpiece region; and defines a first reference point located on a grinding pad mounted to the grinding head and coaxial with an axis of rotation of the grinding head based on the first target offset distance. While traversing the grinding head across first workpiece region, the system thus records a first sequence of positions of the first reference point in contact with the workpiece while traversing the grinding head along the first toolpath to grind the workpiece.

In this example, the system also: Isolates a second workpiece region defining a concave surface profile in the virtual model; s a second toolpath defining a second continuous path across this second workpiece region on the workpiece in Block S140; sets a second target offset distance (e.g., 50% of the radius of the grinding pad)—greater than the first target offset distance—for the second workpiece region; and defines a second reference point located on the grinding pad and offset from the axis of rotation of the grinding head according to the second target offset distance. While traversing the grinding head across second workpiece region, the system thus records a second sequence of positions of the second reference point while traversing the grinding head along the second toolpath to grind the workpiece.

As described below, the system then deforms the virtual model into alignment with both the first sequence of positions of the first reference point and the second sequence of positions of the second reference point.

13. Temperature Monitoring

Figure 5:
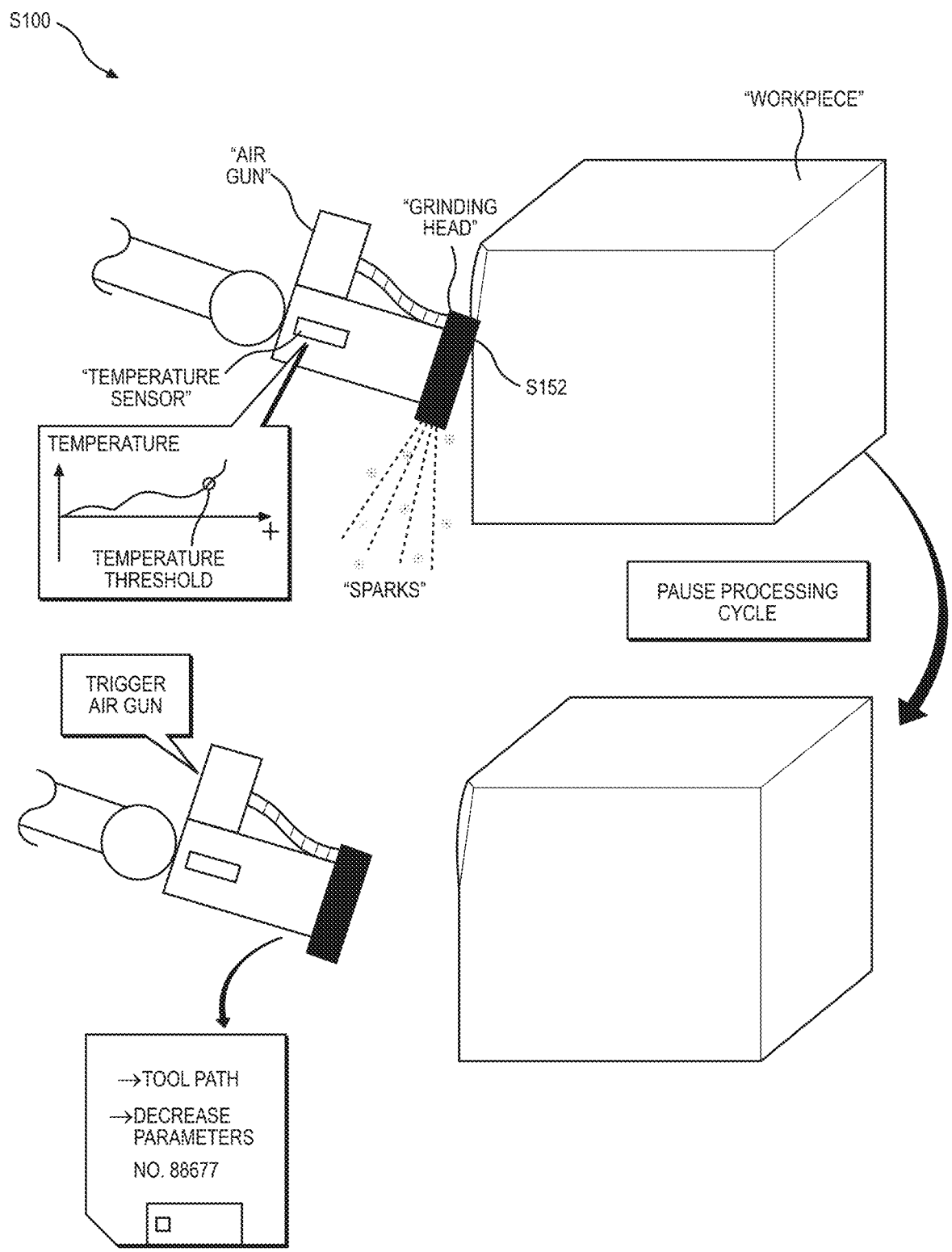
FIG. 5 is a flowchart representation of the method.

In one implementation, as shown in FIG. 5, the system can: during the processing cycle, track a sequence of temperature values captured by a temperature sensor (e.g., infrared sensor array) arranged on the end effector and intersecting the grinding region on the workpiece; and modify—in real time—grinding parameters (e.g., feed rate, torque, force) during the processing cycle to monitor the sequence of temperature values, and trigger a cooling cycle in response to the sequence of temperature values exceeding a target temperature (e.g., 300 degrees Fahrenheit).

In one example, the system can: access a target temperature threshold corresponding to the grinding region on the workpiece; and read a sequence of temperature values from a temperature sensor coupled to the end effector and intersecting the first grinding region during navigation of the grinding head across the first grinding region according to the first tool path. The system can then, at a first time and in response to the sequence of temperature values approximating (e.g., +/−10 degrees Fahrenheit) a first temperature threshold (e.g., 250 degrees Fahrenheit): assign a second target force, less than the first target force, to the first grinding region; and, based on the first sequence of force values, deviate the grinding head from the first tool path to maintain forces of the grinding head on the first grinding region proximal the second target force.

In the aforementioned example, at a second time following the first time and in response to the sequence of temperature values approximating (e.g., +/−10 degrees Fahrenheit) a second temperature threshold (e.g., 275 degrees Fahrenheit), greater than the first temperature threshold (e.g., 250 degrees Fahrenheit), the system can then: pause the processing cycle; trigger an air supply (e.g., air gun, air nozzle) coupled to the grinding head to dispense an air stream (e.g., 50-degree Fahrenheit air stream) across the grinding head; modify a torque parameter of the grinding head to lower energy output toward the first grinding region on the workpiece; and, following a target time period (e.g., 5 minutes), resume the processing cycle.

Therefore, the system can: track a sequence of temperature values corresponding to a temperature of the grinding region on the workpiece during the processing cycle; and, in response to the sequence of temperature values approximating a target temperature value, modify—in real time-energy output from the grinding head toward the grinding head in order to maintain a temperature of the workpiece proximal the target temperature to prevent warping and damage to the workpiece during the processing cycle.

14. Spark Management

In one implementation, the system can include a shield (e.g., heat shield, heat resistant bristles) enveloping the end effector—and therefore the suite of sensors arranged on the end effector—and configured to protect the end effector from debris (e.g., heated material discharge, sparks) resulting from contact of the grinding head to the workpiece during the processing cycle.

In another implementation, as shown in FIG. 5, the system can selectively contact a position of the grinding head to the workpiece in order to direct heated material discharge away from the end effector and the workpiece during the processing cycle. More specifically, the system can, based on an orientation of the workpiece and the end effector, assign a target debris direction relative the first grinding region to direct grinding debris away from the workpiece during contact of the grinding head to the workpiece. The system can then: based on the target debris direction and a direction of rotation of the grinding head, set a radial position of the grinding head orthogonal to the assigned debris direction; during the processing cycle, locate the grinding head at the first position intersecting a first keypoint of the tool path; and drive the grinding head according to the direction of rotation toward the workpiece to direct grinding debris in the target debris direction away from the workpiece. Therefore, the system can, in real time, navigate the grinding head across the workpiece to direct heated material discharge generated from contact of the grinding head to the workpiece away from the workpiece.

15. Review Cycle

In one implementation, following the processing cycle, the system can validate that the processed region (i.e., the grinded region) approximates (e.g., between 95%-100% similarity) the target grinding profile. In this implementation, the system can: following the processing cycle, access an image captured by the optical sensor arranged on the end effector over the processed grinding region on the workpiece; extract a set of visual features from the image; and, based on the set of visual features, interpret a scope of material removal from the processed grinding region on the workpiece. The system can then: generate a spatial contour representation of the processed grinding region according to a difference between a geometry of the workpiece represented in the virtual model and the scope of material removal from the processed grinding region; project the spatial contour representation and the target grinding profile onto the grinding region on the workpiece represented in the virtual model; and calculate a similarity score based on differences in contour characteristics (e.g., dimensions) between the spatial contour representation and the target grinding profile.

Accordingly, in response to the spatial contour representation approximating the target grinding profile (e.g., approximation greater than or equal to 95% to the target grinding profile), the system can flag the processed grinded region in the virtual model as a successfully processed region on the workpiece by the system.

Alternatively, in response to the spatial contour representation deviating from the target grinding profile (e.g., approximation less than 95% to the target grinding profile), the system can: as described above, characterize a second scope of material removal from the grinding region based on a difference between the spatial contour representation and the target grinding profile; generate a second tool path for removal of material from the grinding region to the target grinding profile according to the second scope of material removal; and execute a second processing cycle, as described above, to navigate the grinding head across the grinding region according to the second tool path to approximate the grinding region to the target grinding profile. The system can then repeat the process described above until the grinding region on the workpiece approximates the target grinding profile.

In another implementation, the system can: execute a first processing cycle to navigate the grinding head across the grinding region on the workpiece according to a first tool path defining a set of roughing passes; initiate a review cycle, following the first processing cycle, to characterize a first scope of material removal from the grinding region following the first processing cycle; and execute a second processing cycle, following the review cycle, to navigate the grinding head across the grinding region on the workpiece according to a second tool path defining a set of finishing passes based on the first scope of material removal from the grinding region during the first processing cycle.

For example, following the processing cycle, the system can: assign a second target force, less than the first target force, to the first grinding region; navigate the grinding head, at the second target force, across the first grinding region according to a first finishing pass of the first tool path; following the first finishing pass, access a second image captured by the optical sensor arranged on the end effector over the first grinding region; and extract a second set of visual features from the second image.

The system can then: based on the second set of visual features, interpret a second scope of material removal, less than the first scope of material removal, from the first grinding region; and, based on the second scope of material removal, setting a set of finishing passes to the first tool path for removal of material from the first grinding region to the target grinding profile. Accordingly, during a second processing cycle following the first processing cycle, the system can: access a second sequence of force values output by the force sensor coupled to the grinding head; navigate the grinding head across the first grinding region according to the set of finishing passes of the first tool path; and, based on the second sequence of force values, deviate the grinding head from the set of finishing passes of the first tool path to maintain forces of the grinding head on the first grinding region proximal the second target force.

Therefore, the system can alternate between processing cycles and review cycles to validate that the grinding region on the workpiece approximates the target grinding profile.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for autonomously grinding a workpiece comprising:
    accessing a set of images captured by an optical sensor arranged on an end effector traversing a scan path over a workpiece during a scan cycle;
    compiling the set of images into a virtual model of the workpiece;
    identifying a first grinding region on the workpiece;
    projecting a target grinding profile onto the first grinding region on the workpiece represented in the virtual model, the target grinding profile defining final contour characteristics of the first grinding region;
    based on a geometry of the workpiece and the target grinding profile, generating a first tool path for removal of material from the first grinding region toward the target grinding profile;
    assigning a first target force to the first grinding region; and
    during a first processing cycle:
        accessing a first sequence of force values output by a force sensor coupled to a grinding head arranged on the end effector; and
        via a set of actuators coupled to the end effector:
            navigating the grinding head across the first grinding region according to the first tool path; and
            based on the first sequence of force values, deviating the grinding head from the first tool path to maintain forces of the grinding head on the first grinding region proximal the first target force.

2. The method of claim 1:
    wherein identifying the first grinding region on the workpiece comprises:
        detecting a marker, arranged proximal the first grinding region on the workpiece, depicted in a first image in the set of images; and
        based a geometry of the marker:
            identifying the first grinding region as corresponding to a first fillet weld on the workpiece; and
            accessing, from a profile library, the target grinding profile associated with the first fillet weld and characterized by a target throat thickness for the first fillet weld;
    wherein projecting the target grinding profile onto the first grinding region on the workpiece comprises:
        identifying a first fillet thickness of the first fillet weld of the workpiece represented in the virtual model; and
        projecting the target throat thickness onto the first fillet weld on the workpiece represented in the virtual model; and
    wherein generating the first tool path comprises, based on a difference between the first throat thickness and the target throat thickness of the first fillet weld, generating the first tool path to remove material from the first fillet weld to the target throat thickness.

3. The method of claim 1:
    wherein identifying the first grinding region on the workpiece comprises:
        accessing a reference virtual model corresponding to the workpiece, the reference virtual model representative of the workpiece at a target surface finish; and
        based on a difference between the reference virtual model and the virtual model of the workpiece, identifying the first grinding region on the workpiece as corresponding to a first gate zone comprising a first gate;
    wherein projecting the target grinding profile onto the first grinding region on the workpiece comprises:
        extracting, from the reference virtual model, the target grinding profile associated with the first gate zone and characterized by a target surface finish of the first gate zone; and
        projecting the target surface finish onto the first gate zone comprising the first gate on the workpiece represented in the virtual model; and
    wherein generating the first tool path comprises, based on a geometry of the first gate and the target surface finish, generating the first tool path to remove material from the first gate, at the first gate zone, to the target surface finish.

4. The method of claim 1:
    further comprising accessing a surface finish specification associated with the workpiece;
    wherein identifying the first grinding region on the workpiece comprises:
        generating a prompt requesting an operator to select virtual regions on the virtual model;
        serving the prompt and the virtual model to the operator via an operator portal; and
        receiving selection of a first virtual region on the virtual model, corresponding to the first grinding region on the workpiece, via the operator portal;
    wherein projecting the target grinding profile onto the first grinding region on the workpiece comprises:
        extracting the target grinding profile, from the surface finish specification, associated with the first grinding region on the workpiece and characterized by a set of target dimensions for the first grinding region; and
        projecting the set of target dimensions onto the first grinding region on the workpiece represented in the virtual model; and
    wherein generating the first tool path comprises:
        based on a difference between a first set of dimensions of the grinding region represented in the virtual model and the set of target dimensions, calculating a first scope of material removal from the first grinding region; and
        generating the first tool path according to the first scope of material removal from the first grinding region.

5. The method of claim 1:
    further comprising accessing a set of characteristics corresponding to a base metal of the workpiece;
    wherein assigning the first target force comprises, based on the set of characteristics, assigning the first target force to the first grinding region;
    further comprising, based on the set of characteristics, setting a set of grinding parameters for the first tool path comprising:
        a nominal feed rate for navigating the grinding head over the workpiece;
        a nominal stepover distance across the workpiece; and
        a nominal offset angle between an axis of the grinding head and a normal vector per unit area on the workpiece; and wherein navigating the grinding head across the first grinding region according to the first tool path comprises navigating the grinding head at the first target force, the nominal feed rate, the nominal stepover distance, and the nominal offset angle across the first grinding region.

6. The method of claim 1:
wherein identifying the first grinding region on the workpiece comprises:
  accessing a first image in the set of images;
  extracting a first set of visual features from the first image;
  identifying a first marker on the workpiece, depicted in the first image, based on the first set of visual features;
  projecting the first marker onto the virtual model based on the first image; and
  deriving a boundary, based on the first marker, of a first virtual region corresponding to the first grinding region on the workpiece represented in the virtual model;
wherein generating the first tool path comprises defining a sequence of tool path coordinates within the boundary of the first grinding region on the workpiece; and
wherein navigating the grinding head across the first grinding region comprises navigating the grinding head along the sequence of tool path coordinates within the boundary of the first grinding region.

7. The method of claim 1:
wherein accessing the set of images comprises accessing the set of images captured by a color camera arranged on the end effector traversing the scan path over the workpiece during the scan cycle;
wherein identifying the first grinding region on the workpiece comprises:
  accessing a first image in the set of images;
  extracting a first set of visual features from the first image;
  based on the first set of visual features, identifying a first marker, on the workpiece, depicted in the first image and characterized by:
    a first marker color; and
    a first marker geometry;
  projecting the first marker onto a first virtual region on the virtual model representing the workpiece based on the first image; and
  based on the first marker geometry of the first marker, identifying the first virtual region on the virtual model as corresponding to the first grinding region on a first grinding method on the workpiece; and
wherein projecting the target grinding profile onto the first grinding region comprises:
  querying a profile library for the target grinding profile characterized by a first set of final contour characteristics based on the first marker color of the first marker; and
  projecting the target grinding profile according to the first set of contour characteristics onto the first grinding region on the workpiece represented in the virtual model.

8. The method of claim 7, further comprising:
accessing a second image in the set of images;
extracting a second set of visual features from the second image;
based on the second set of visual features, identifying a second marker, on the workpiece, depicted in the second image and characterized by:
  a second marker color, colorfully distinct from the first marker color; and
  a second marker geometry, geometrically distinct from the first marker geometry;
projecting the second marker onto a second virtual region on the virtual model representing the workpiece based on the second image;
based on the second marker geometry of the second marker, identifying the second virtual region on the virtual model as corresponding to a second grinding region, offset from the first grinding region, of a second grinding method on the workpiece;
querying the profile library for a second target grinding profile characterized by a second set of contour characteristics, distinct from the first set of contour characteristics, based on the second marker color of the second marker;
projecting the second target grinding profile according to the second set of contour characteristics onto the second grinding region on the workpiece represented in the virtual model; and
based on the geometry of the workpiece and the target grinding profile, generating a second tool path for removal of material from the second grinding region to the second target grinding profile.

9. The method of claim 1, further comprising:
during a first pre-processing cycle preceding the processing cycle:
  navigating the grinding head, at the first target force, across the first grinding region according to a first roughing pass of the first tool path;
  following the first roughing pass, accessing a first image captured by the optical sensor arranged on the end effector over the first grinding region;
  extracting a first set of visual features from the first image;
  based on the first set of visual features, interpreting a first scope of material removal from the first grinding region; and
  based on the first scope of material removal, setting a set of roughing passes to the first tool path for removal of material from the first grinding region; and
during the first processing cycle:
  navigating the grinding head across the first grinding region according to the set of roughing passes of the first tool path; and
  based on the first sequence of force values, deviating the grinding head from the set of roughing passes of the first tool path to maintain forces of the grinding head on the first grinding region proximal the first target force.

10. The method of claim 9, further comprising:
following the first processing cycle:
  assigning a second target force, less than the first target force, to the first grinding region;
  navigating the grinding head, at the second target force, across the first grinding region according to a first finishing pass of the first tool path;
  following the first finishing pass, accessing a second image captured by the optical sensor arranged on the end effector over the first grinding region;
  extracting a second set of visual features from the second image;

based on the second set of visual features, interpreting a second scope of material removal, less than the first scope of material removal, from the first grinding region; and
based on the second scope of material removal, setting a set of finishing passes to the first tool path for removal of material from the first grinding region to the target grinding profile; and
during a second processing cycle following the first processing cycle:
accessing a second sequence of force values output by the force sensor coupled to the grinding head; and
via the set of actuators coupled to the end effector:
navigating the grinding head across the first grinding region according to the set of finishing passes of the first tool path; and
based on the second sequence of force values, deviating the grinding head from the set of finishing passes of the first tool path to maintain forces of the grinding head on the first grinding region proximal the second target force.

11. The method of claim 1:
wherein generating the first tool path comprises:
based on the geometry of the workpiece, defining a linear sequence of tool path coordinates within the first grinding region on the workpiece; and
wherein navigating the grinding head across the first grinding region comprises navigating the grinding head across the first grinding region to uniformly wear the grinding head across the first grinding region by:
navigating the grinding head at a first radial position across the first grinding region along the linear sequence of tool path coordinates during a first pass of the first tool path; and
navigating the grinding head at a second radial position, less than the first radial position, across the first grinding region along the linear sequence of tool path coordinates during a second pass, following the first pass, of the first tool path.

12. The method of claim 1, further comprising during the processing cycle:
accessing a target temperature threshold of the grinding head;
reading a sequence of temperature values from a temperature sensor coupled to the end effector and intersecting the first grinding region during navigation of the grinding head across the first grinding region according to the first tool path;
at a first time, in response to the sequence of temperature values approaching a first temperature threshold:
assigning a second target force, less than the first target force, to the first grinding region; and
based on the first sequence of force values, deviating the grinding head from the first tool path to maintain forces of the grinding head on the first grinding region proximal the second target force.

13. The method of claim 12, further comprising:
at a second time following the first time, in response to the sequence of temperature values approximating a second temperature threshold, greater than the first temperature threshold:
triggering an air supply to dispense an air stream across the grinding head; and
modifying a speed parameter of the grinding head to lower energy output toward the first grinding region on the workpiece.

14. The method of claim 1:
wherein generating the first tool path comprises:
defining the first tool path comprising an ordered sequence of keypoints located on the first grinding region and defined in the virtual model of the workpiece; and
for each keypoint in the ordered sequence of keypoints:
calculating a vector normal to the virtual model at a location of the keypoint on the virtual model; and
storing the vector in the keypoint; and
wherein navigating the grinding head across the workpiece according to the first tool path comprises:
for a first keypoint in the ordered sequence of keypoints:
locating the grinding head at a first position intersecting the first keypoint;
aligning an axis of the grinding head to a first vector associated with the first keypoint; and
driving the grinding head coaxial with the first vector, toward the workpiece to match force values, in the first sequence of force values, to the first target force.

15. The method of claim 14:
further comprising, based on an orientation of the workpiece, assigning a target debris direction to the first grinding region to direct grinding debris away from the workpiece during contact of the grinding head to the workpiece; and
wherein navigating the grinding head across the workpiece according to the first tool path comprises:
based on the target debris direction and a direction of rotation of the grinding head, locating the grinding head at the first position intersecting the first keypoint; and
driving the grinding head according to the direction of rotation toward the workpiece to direct grinding debris in the target debris direction away from the workpiece.

16. The method of claim 1, following the processing cycle, further comprising:
accessing a first image captured by the optical sensor arranged on the end effector over the first grinding region;
extracting a first set of visual features from the first image;
based on the first set of visual features, interpreting a first scope of material removal from the first grinding region;
generating a spatial contour representation based on the first scope of material;
projecting the spatial contour representation and the target grinding profile onto the first grinding region on the workpiece represented in the virtual model; and
in response to the spatial contour representation deviating from contour characteristics in the target grinding profile:
based on a difference between the spatial contour representation and the target grinding profile, generating a second tool path for removal of material from the first grinding region to the target grinding profile; and
during a second processing cycle, navigating the grinding head across the first grinding region according to the second tool path.

17. A method for autonomously grinding a workpiece comprising:

during a pre-processing cycle:
  accessing a virtual model representing the workpiece;
  accessing a first image captured by an optical sensor arranged on an end effector traversing a scan path over the workpiece;
  detecting a marker, on the workpiece, depicted in the first image;
  based on a geometry of the marker:
    identifying a first grinding region on the workpiece; and
    accessing a target grinding profile associated with the first grinding region and representing final contour characteristics of the first grinding region;
  projecting the target grinding profile onto the first grinding region on the workpiece represented in the virtual model;
  based on a geometry of the workpiece and the target grinding profile, generating a first tool path for removal of material from the first grinding region to the target grinding profile; and
  assigning a first target force to the first grinding region; and
during a processing cycle:
  accessing a first sequence of force values output by a force sensor coupled to a grinding head;
  navigating the grinding head across the first grinding region according to the first tool path; and
  based on the first sequence of force values, deviating the grinding head from the first tool path to maintain forces of the grinding head on the first grinding region proximal the first target force.

18. The method of claim 17:
further comprising:
  projecting the marker onto the virtual model based on the first image; and
  deriving a coordinate location bounded by the first marker of a first virtual region corresponding to the first grinding region on the workpiece represented in the virtual model;
wherein generating the first tool path comprises:
  calculating a boundary of the first grinding region based on the coordinate location bounded by the first marker of the first virtual region on the virtual model; and
  defining a sequence of tool path coordinates within the boundary of the first grinding region on the workpiece; and
wherein navigating the grinding head across the first grinding region comprises navigating the grinding head along the sequence of tool path coordinates within the boundary of the first grinding region.

19. The method of claim 17, further comprising:
during a first pre-processing cycle preceding the processing cycle:
  navigating the grinding head, at the first target force, across the first grinding region according to a first roughing pass of the first tool path;
  following the first roughing pass, accessing a first image captured by the optical sensor arranged on the end effector over the first grinding region;
  extracting a first set of visual features from the first image;
  based on the first set of visual features, interpreting a first scope of material removal from the first grinding region; and
  based on the first scope of material removal, setting a set of roughing passes to the first tool path for removal of material from the first grinding region; and
during the first processing cycle:
  navigating the grinding head across the first grinding region according to the set of roughing passes of the first tool path; and
  based on the first sequence of force values, deviating the grinding head from the set of roughing passes of the first tool path to maintain forces of the grinding head on the first grinding region proximal the first target force.

\* \* \* \* \*